United States Patent [19]

Acker, III et al.

[11] Patent Number: 4,844,489
[45] Date of Patent: Jul. 4, 1989

[54] CHUCK APPARATUS AND METHOD

[75] Inventors: William L. Acker, III, Lenoxville; Dan Hryhorcoff, Olyphant; Gary T. Powell, Avoca, all of Pa.

[73] Assignee: Acker Drill Co., Scranton, Pa.

[21] Appl. No.: 111,650

[22] Filed: Oct. 23, 1987

[51] Int. Cl.$^4$ .............................................. B23B 31/16
[52] U.S. Cl. ........................................ 279/4; 188/67; 279/121
[58] Field of Search ............ 188/67; 279/4, 28, 49–59, 279/121

[56] References Cited

U.S. PATENT DOCUMENTS

| | | | |
|---|---|---|---|
| 2,768,830 | 10/1956 | Janson | 279/4 |
| 2,905,998 | 9/1959 | Acker | 24/254 |
| 3,076,245 | 2/1963 | Acker | 24/263 |
| 3,427,036 | 2/1969 | Siebelhoff | 279/4 |
| 3,731,942 | 5/1973 | Buck | 279/4 |
| 3,742,562 | 7/1973 | Haby | 188/67 |
| 3,792,869 | 2/1974 | Braun | 279/4 |
| 3,863,940 | 2/1975 | Cummings | 279/50 |
| 3,992,019 | 11/1976 | Crawshay | 279/4 |
| 3,999,260 | 12/1976 | Stuckey et al. | 188/67 |
| 4,196,914 | 4/1980 | Kutman et al. | 279/4 |
| 4,273,200 | 6/1981 | Lambot | 173/166 |

Primary Examiner—Neil Abrams
Attorney, Agent, or Firm—Dickstein, Shapiro & Morin

[57] ABSTRACT

A chuck apparatus including a plurality of radially movable jaws for gripping a drill rod, each jaw being moved radially by an axially movable bowl, each jaw and the corresponding bowl surfaces are provided with two sets of camming surfaces, the first set of camming surface being oriented with a steeper angle than the second set of camming surfaces. In operation, as the bowl moves relative to the jaws with the respective first set of camming surfaces of the jaws and the bowl in contact, the jaw gripping force is relaxed and the jaws release the drill rod. As the bowl and jaws continue to move they transition to interact at their respective second set of camming surfaces whereupon, because the shallow angle of interface, the jaws are moved through a greater distance than if the first set of camming surfaces' steeper angle of interface were employed. As a result, more clearance is provided for freeing the drill rod.

20 Claims, 3 Drawing Sheets

CHUCK APPARATUS AND METHOD

BACKGROUND OF THE INVENTION

The present invention relates generally to a chuck apparatus and method for gripping a tool or workpiece and more particularly to an automatic rotating hydraulic chuck construction and method using a number of jaws moved radially inward and outward for gripping a drill pipe for earth boring machines.

A chuck for gripping a drill pipe in an earth boring machine should provide a high gripping force for securely gripping the drill pipe, and additionally should provide substantial movement of the gripping surfaces for releasing the drill pipe. In use, chucks may become clogged with material removed from the workpiece. In the case of earth boring machines, the chuck may become clogged with dirt, clay or other earth material, which may cake and harden and which may adversely affect the operation of the chuck. In earth boring machines, because of the accumulation of earth material on the drill rods, normal movement of the jaws does not provide adequate clearance for smooth passage of the drill rods through the chuck.

In one known construction, as shown in Buck, U.S. Pat. No. 3,731,942, the chuck includes a gripping sleeve positioned in a housing. The gripping sleeve and the housing are each provided with a number of cam surfaces. When the sleeve is moved relative to the housing the sleeve is deformed radially inward to engage and grip the drill rod.

In other known devices, jaws are moved radially inward by the movement of a bowl or wedge. The rear surfaces of the jaws bear against the wedge or bowl on a single plane having a steep angle for effecting a high gripping force on the drill rod. Examples of such devices include Janson, U.S. Pat. No. 2,768,830, Siebelhoff, U.S. Pat. No. 3,427,036, Braun, U.S. Pat. No. 3,792,869, Crawshay, U.S. Pat. No. 3,992,019, Kutman et al, U.S. Pat. No. 4,196,914, Lambot, U.S. Pat. No. 4,273,200, Acker, U.S. Pat. No. 3,076,245 and Acker, Jr., U.S. Pat. No. 2,905,998. These devices provide relatively little movement of the jaws for releasing the drill rod.

There is a need in the art for a chuck construction which provides a high gripping force to grip the drill rod and greater horizontal movement of the gripping surface for releasing the rod.

SUMMARY OF THE INVENTION

The disadvantages of the prior art devices are alleviated to a great extent by the present invention which includes a chuck apparatus provided with a plurality of radially movable jaws for gripping a drill rod, each jaw being moved radially by an axially movable bowl. Each jaw and the bowl are provided with two sets of camming surfaces, the first set of camming surface being oriented with a steeper angle than the second set of camming surfaces.

In operation, as the bowl moves axially, it bears against and moves the jaws radially. Starting in the gripping position, with the respective first sets of camming surfaces of the jaws and the bowl in contact, as the bowl moves axially, the jaw gripping force is relaxed and the jaws release the drill rod. As the bowl and jaws continue to move, they transition to interact at their respective second sets of camming surfaces, whereupon, because of the shallow angle of interface, for a given axial displacement of the bowl, the jaws are moved through a greater radial distance than if the first sets of camming surfaces' steeper angle of interface were employed. As a result, more radial movement of the jaws is provided and therefore more clearance is provided for freeing the drill rod.

It is an object of the present invention to provide a chuck construction that effects a high gripping force on a drill pipe and that provides increased movement of the jaws for releasing the rod.

Other objects and advantages of the present invention will be readily apparent from the following description and drawings which illustrate the preferred embodiment of the invention.

DESCRIPTION OF A PREFERRED EMBODIMENT

Figure 1:
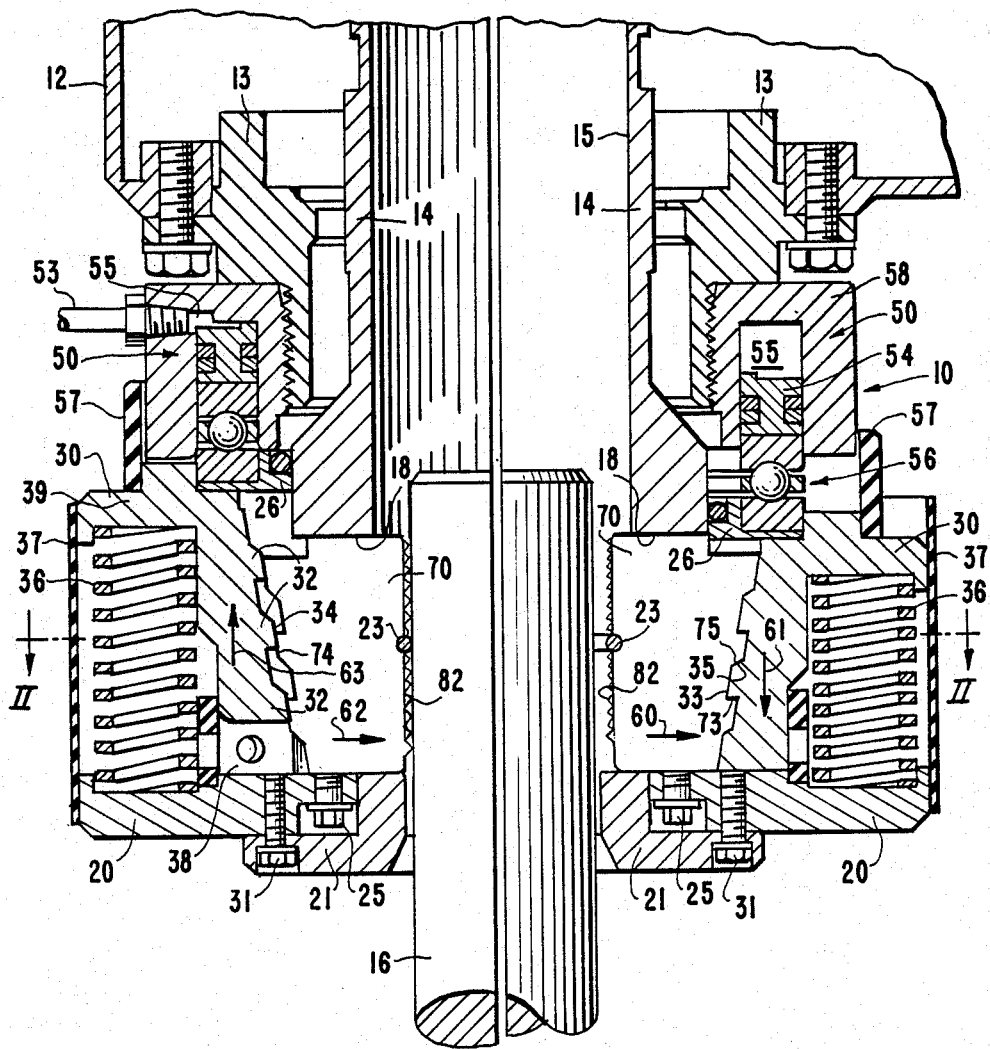
FIG. 1 is a cross-sectional view of the hydraulic chuck of a preferred embodiment of the present invention showing the chuck in the gripping position on the left side and the release position on the right side.

Refer to FIG. 1, there being shown a cross-sectional view of a preferred embodiment of a hydraulic chuck, generally referred to by reference number 10, according to the present invention. The left side of FIG. 1 shows the chuck 10 in the gripping position and the right side shows the chuck 10 in the release position. The chuck 10 is attached onto the bottom cover 13 of a drill head 12. The drill head 12 includes conventional mechanism (not shown) for driving and rotating and spindle 14 relative to the drill head.

The spindle 14 is provided with a plurality of angularly spaced jaw slots 18 that extend radially through the spindle 14 and open to the interior surface 15 and the exterior surface 17 of the spindle 14. The jaw slots 18 extend axially to the lower end 22 of the spindle 14. A retainer ring 20 is fastened into the lower end of the spindle 14 by suitable means, such as by bolts 25 in the embodiment of FIG. 16. A ring shaped end cover 21 is fastened into the lower surface of the retainer ring 20 by bolts 31. The end cover 21 is concentric with and extending into the central opening of retainer ring 20 and is provided with a central bore through which the drill pipe 16 extends. The retainer ring 20 and the end cover 21 together with the jaw slots 18 provide the surfaces in which the jaws 70 move radially. The end cover 21 may be removed for allowing access to the chuck 10 for changing the jaws 70 or for cleaning the interior of the chuck 10.

Figure 5:
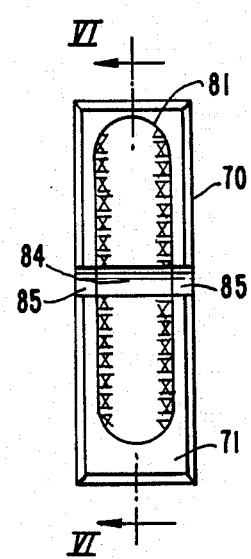
FIG. 5 is a view of the gripping face of the jaws of the embodiment of FIG. 1.

The jaws 70 are urged in a radially outward, or releasing, direction by a central ring expansion spring 23 which is positioned in compression to lie in grooves 84, 85 (FIG. 5) formed in the gripping face of each jaw 70, as described in more detail below.

A bowl 30 is positioned concentrically about the drive spindle 14. The bowl 30 is adapted for free axial sliding movement relative to the spindle 14. The bowl 30 is urged axially upward by a plurality of coil springs 36 positioned in compression between the flange 39 of the bowl 30 and the retainer ring 20. A plurality of recesses are provided in the flange 39 and the retainer ring 20 for individually accepting the ends of the springs 36. A cylindrical spring guard 37, affixed to the outer periphery of the retainer ring 20 and extending at least as far as the flange 39, is provided to help retain the springs 36 and to protect the springs 36 from contaminants.

The bowl 30 is urged axially downward, against the force of the springs 36, by a hydraulic piston assembly 50. The piston assembly 50 includes an annular block 58 affixed to nonrotating bottom cover 13 and having an annular trough 55 forming the hydraulic chamber. A ring shaped piston 54 rides in the trough 55 and urges against a thrust bearing 56 also sized to at least partially ride in trough 55. The thrust bearing 56 bears against the bowl 30 via a sealing ring 26. A cylindrical bearing guard 57 encircles and is attached to the outer periphery of the bowl 30 and extends to the block 58 to protect bearing 56 from contamination. Piston assembly 50 is operated by hydraulic fluid selectively provided at desired pressures to chamber 55, via hydraulic fluid supply 53, to counteract the force of the springs 36.

In the gripping position, as depicted on the left side of FIG. 1, the force of coil compression springs 36 urges the bowl 30 axially upward, in the direction of arrow 63 until the force exerted by springs 36 is equaled by the counter force exerted by drill pipe 16 through jaws 70, or until the upper surface of the piston 54 contacts the top of chamber 55. In this gripping position, the first set of camming surfaces 34 of the bowl 30 is in contact with the first sets of camming surfaces 74 of the jaws 70. The first sets of camming surfaces are angled steep with respect to the gripping direction, as shown by the arrow 62, to enhance the force exerted in the direction 62 on the jaws 70, and thus the drill pipe 16, by springs 36 urging bowl 30 in the direction of the arrow 63. The gripping position is achieved when the hydraulic fluid pressure supplied to chamber 55 to act on the piston assembly 50 is relieved.

In the release position, as depicted on the right side of FIG. 1, hydraulic fluid is provided to chamber 55 to urge piston assembly 54 axially downward. The piston 54 moves the bowl 30 downward in the direction of arrow 61 thereby sliding the first sets of camming surfaces by each other. The second sets of camming surfaces 35 of the bowl 30 then engage the second set of camming surfaces 75 of the jaws 70. The second sets of camming surfaces 35 and 75 are oriented at a shallower angle than the first sets of camming surfaces 34 and 74. Therefore, the jaws 70 are moved radially in the direction of the arrow 60 to release the drill bit. The less steep angle of the second sets of camming surfaces provides for a substantial increase in horizontal movement of the jaws 70 for a given vertical movement of bowl 30.

Figure 2:
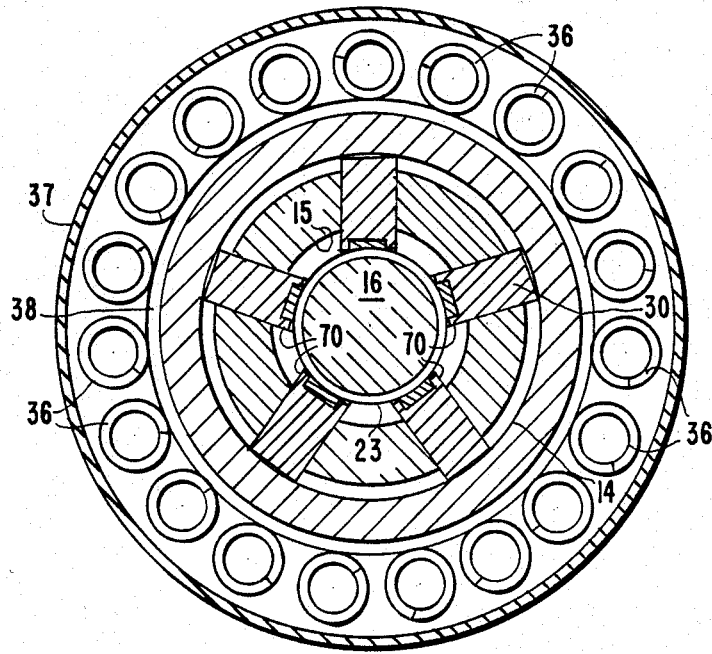
FIG. 2 is a view taken along section line II—II of FIG. 1 but showing the entire chuck in the gripping position as in the left side of FIG. 1.

Refer now to FIG. 2 wherein is shown a cross-sectional view taken along section line II—II of FIG. 1. The coil springs 36 are disposed about the periphery of the chuck and are held between the outer spring guard 37 and the bowl guide ring 38. As mentioned above, the spring guard 37 functions to keep dirt and foreign matter out of the spring area.

In FIG. 2, the drill pipe 16 is shown in place with jaws 70 in a gripping position. The expansion spring 23 circles the drill pipe 16 and is in compression to urge the jaws 70 radially outward from contact with the drill pipe 16. The jaws 70 extend out from the outside surface of spindle 14 to contact bowl 30. As the spindle 14 rotates, the entire apparatus shown in FIG. 2 is rotated.

Figure 4:
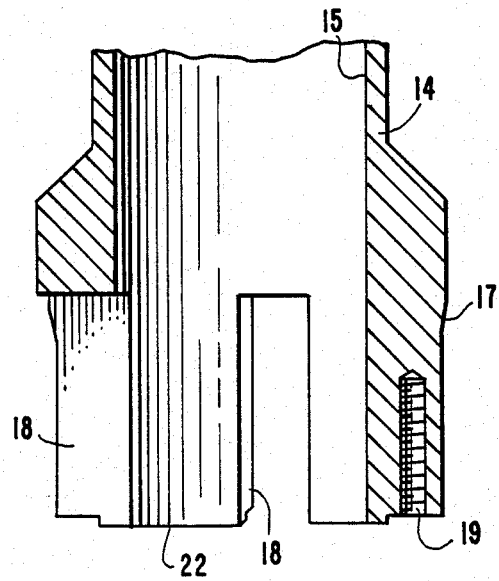
FIG. 4 is a view taken along section line IV—IV of FIG. 3.
Figure 3:
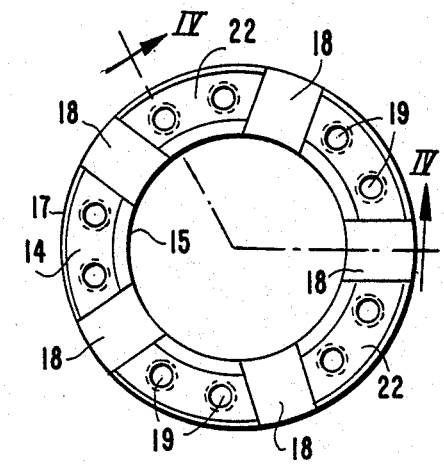
FIG. 3 is a bottom end view of the spindle of the embodiment of FIG. 1.

FIG. 3 shows a bottom end view of the spindle of FIG. 1. Note the jaw slots 18 for carrying the jaws 70 and the threaded bores 19 for accepting bolts 25 to hold the retainer ring 20 to the spindle 14. FIG. 4 shows a cross-sectional view of the spindle and illustrates the height of the jaw slots 18 and the threaded bore 19.

Refer now to FIGS. 5–8 which show the detail of the construction of the jaws 70. A hard toothed insert 81 is positioned in a recess of the face of each jaw 70. The insert 81 may be changed when the teeth 82 have become worn, or to provide a different type of insert. Slots 85 and 84 are formed through the jaws 70 and the inserts 81, respectively, for accepting the expansion ring 23, as shown in FIG. 1.

Figure 6:
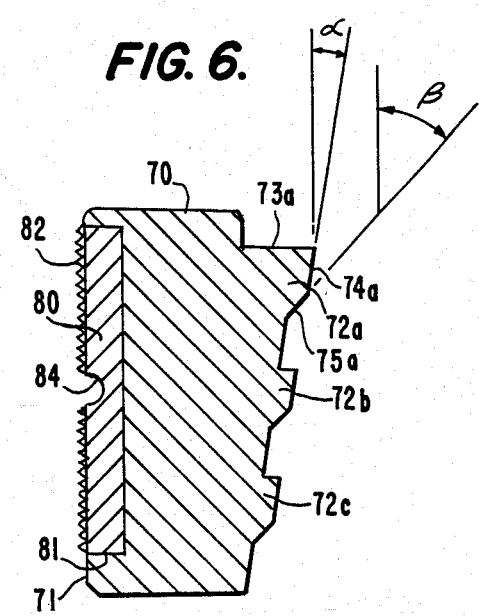
FIG. 6 is a view taken along section line VI—VI of FIG. 5.

FIG. 6 shows a cross-sectional view of a jaw 70. The rear portion of the jaw 70 is provided with three jaw cams 72a, 72b and 72c. Each cam is provided with two cam surfaces. The first cam surface 74 is formed of an angle alpha with the vertical. An angle alpha of about 10° has yielded satisfactory results. A second cam surface 75 is formed at an angle beta from the vertical. An angle beta of about 45° has yielded satisfactory results.

Figure 7:
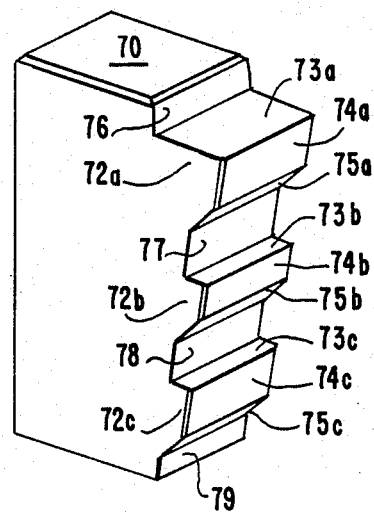
FIG. 7 is a perspective view of the jaw of FIGS. 5 and 6.

With reference to FIG. 7 it can be seen that cam 72a is provided with a first cam surface 74a and a second cam surface 75a. Cam 72b is provided with a first cam surface 74b and a second cam surface 75b. And third cam 72c is provided with a first cam surface 74c and a second cam surface 75c. The cams also have top surfaces 73a, 73b and 73c respectively. The remainder of the rear face of the jaw includes a face 76 (which, with seal 26 provides a seal for bearing 56) above the first cam, face 77 between the first and second cams, face 78 between the second and third cams, and a face 79 below the third cam. Faces 77, 78 and 79 are oriented at angle alpha from the vertical.

Figure 8:
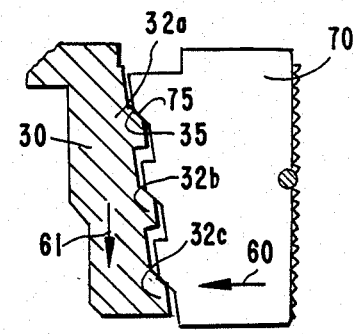
FIG. 8 is a view showing an intermediate stage of interaction of the bowl and jaws of the embodiment of FIG. 1.

With reference to FIG. 8, bowl 30 is provided with three cams 32a, 32b and 32c which correspond to cams 72a, 72b and 72c respectively of each jaw. The cams 32, which are formed in a continuous radial manner about bowl 30, have camming surfaces 34 and 35 which are also found at angles alpha and beta and which are parallel to camming surfaces 74 and 75 when arranged in chuck 10.

In operation of the device, as illustrated by FIGS. 1 and 8, with the bowl 30 and jaws 70 moving in the directions of the arrows 61 and 60 respectively, as shown in FIG. 8, and the right portion of FIG. 1, the camming surfaces 75 interact with the surfaces 35 to provide a relatively large horizontal movement of each jaw 70 for a given vertical movement of the bowl 30. For an angle beta of forty-five degrees the axial distance moved by the bowl 30 is equal to the radial distance moved by each of the jaws 70. However, with the surfaces 74 and 34 interacting, a much smaller horizontal movement of jaw 70 for a given incremental vertical movement of bowl 30. The smaller movement and steeper angle yield a higher effective gripping force by the jaws 70 on the drill pipe 16 for a given force exerted by spring 36.

Although the preferred embodiment illustrates a chuck mounted on the bottom of the spindle, the invention is not limited to that arrangement. A chuck may be mounted at the top of the spindle and the chuck structure may be inverted or otherwise modified as desired to incorporate the invention in such a top-mounted embodiment.

The above description and drawings are only illustrative of a preferred embodiment which achieves the objects, features and advantages of the present invention, and it is not intended that the present invention be limited thereto. Any modifications of the present invention which comes within the spirit and scope of the following claims is considered part of the present invention.

What is claimed as new and desired to be secured by Letters Patent of the United States is:

1. A chuck apparatus comprising:
   a tubular spindle;
   a plurality of jaw slots extending radially through said spindle;
   a plurality of jaws disposed in said jaw slots for only radial movement therethrough, each of said jaws having a gripping surface and an interface surface, said interface surface having a first camming surface and a second camming surface;
   a bowl adapted to move said jaws only radially in response to axial movement of said bowl, said bowl having a first set of camming surfaces and a second set of camming surfaces,
   said first camming surfaces on said jaws and said bowl being steeper than said second camming surfaces such that for a given axial movement of said bowl said jaw moves a greater horizontal radial distance when said second camming surface are in engagement than when said first camming surface are in engagement.

2. A chuck apparatus for gripping a rotating boring tool comprising:
   jaw means for contacting and holding the tool during use;
   moving means for moving said jaw means only radially towards the tool to contact and engage the tool and for moving said jaw means only radially away from the tool to release the tool;
   driving means for exerting a force on said moving means to move said jaw means towards the tool;
   said moving means and said jaw means being adapted such that, for a given moving means rate of movement, said jaw means moves only radially at a first rate when close to the tool and only radially at a second rate, which is greater than said first rate, when farther away from said tool.

3. An apparatus as in claim 2 wherein said jaw means includes at least one jaw first camming surface and at least one jaw second camming surface, said moving means includes at least one moving means first camming surface and at least one moving means second camming surface, said first and second camming surfaces being adapted to move against each other to cause said jaw to move at said first and second rates respectively.

4. An apparatus as in claim 3 wherein said jaw means includes a plurality of jaws disposed radially about the tool, each of the jaws having a gripping surface disposed towards the tool and having said camming surfaces disposed away from the tool and being adapted for movement radially towards and away from said tool.

5. An apparatus as in claim 4 wherein said moving means includes a bowl disposed concentrically about said jaws and having camming surfaces positioned to interact with the jaw camming surfaces.

6. An apparatus as in claim 5 wherein said jaws are adapted to move radially in and out depending upon the axial movement of said bowl.

7. An apparatus as in claim 6 wherein each of said jaws includes a plurality of cams each having a corresponding said jaw first camming surface and said jaw second camming surface and said bowl includes a corresponding plurality of cams each having said first camming surface and said second camming surface.

8. An apparatus as in claim 7 wherein the angle of said camming surfaces with respect to the direction of axial movement of the bowl is greater for said second camming surfaces than for said first camming surfaces.

9. An apparatus as in claim 8 wherein the angle of said first camming surfaces is between about $\frac{1}{2}°$ and 30°.

10. An apparatus as in claim 9 wherein the angle of said second camming surfaces is between about 3° and 75°.

11. An apparatus as in claim 10 wherein the angle of said first camming surfaces is about 10° and the angle of said second camming surfaces is about 45°.

12. An apparatus as in claim 11 wherein said driving means includes an hydraulically operated piston.

13. An apparatus as in claim 12 wherein said moving means includes a centrally disposed expansion ring, in compression, urging said jaws radially outwards.

14. An apparatus as in claim 13 wherein the jaws are carried in a rotating drive spindle having radially formed slots.

15. An apparatus as in claim 14 wherein said hydraulic piston is cylindrical and is disposed concentrically about said drive spindle.

16. An apparatus as in claim 15 wherein said piston bears against a cylindrical thrust bearing such that the bowl interacting with the jaws are driven by the drive spindle and the hydraulic cylinder and piston remains stationary.

17. An apparatus as in claim 16 wherein said moving means includes a spring means urging said bowl against said thrust bearing.

18. An apparatus as in claim 17 wherein a circular retainer ring is affixed to the bottom of said drive spindle, said spring means being compressed between said retainer ring and said bowl.

19. An apparatus as in claim 18 wherein a circular end cover is affixed to the retainer ring and is adjacent the tool and may be removed to provide for access to replace the removable jaws and for cleaning the chuck apparatus.

20. A method for gripping and releasing a rotating boring tool comprising the steps of:
   (a) Providing only radial moving jaw means for contacting and holding the tool during use, moving means for moving said jaw means only radially towards the tool to contact and engage the tool and for moving said jaw means only radially away from the tool to release the tool, driving means for exerting a force on said moving means to move said jaw means towards the tool, said moving means and said jaw means being adapted such that, for a given moving means rate of movement, said jaw means moves only radially at a first rate when close to the tool and only radially at a second rate, which is greater than said first rate, when farther away from said tool;
(b) inserting the tool into said chuck;
(c) operating said driving means to move said jaws first at said second rate then at said first rate to grip the tool;
(d) releasing said driving means so that said moving means moves the jaws first at said first rate and then at said second rate to release the tool.

* * * * *